Dec. 5, 1939.  H. CREGAR  2,181,873
COMBINATION DIRECTIONAL DRILLING AND TAPPING UNIT
Filed Nov. 6, 1937  2 Sheets-Sheet 1

Inventor.
Howard Cregar
By
Williams, Bradbury, McCaleb & Hinkle
Attys.

Dec. 5, 1939.  H. CREGAR  2,181,873
COMBINATION DIRECTIONAL DRILLING AND TAPPING UNIT
Filed Nov. 6, 1937   2 Sheets-Sheet 2

Inventor.
Howard Cregar
By Williams, Bradbury, McCaleb & Hinkle
Attys.

Patented Dec. 5, 1939

2,181,873

UNITED STATES PATENT OFFICE 2,181,873

COMBINATION DIRECTIONAL DRILLING AND TAPPING UNIT

Howard Cregar, Richmond, Ind., assignor to The National Automatic Tool Company, Richmond, Ind., a corporation of Indiana Application November 6, 1937, Serial No. 173,066

9 Claims. (Cl. 10—128)

It has been the conventional practice when it has been necessary to machine a work piece on more than one side, to employ a plurality of separate machines, with one or more machines being used for each side. The work piece would be located with respect to each machine and with respect to each side to be machined. In most instances, this entailed moving the work piece by hand from one machine to another and fastening the work piece upon the individual work table of each machine, while in other instances, the work piece would be mounted on a work table common to several machines which would be clustered around it.

In those instances where a common work table was used two practices developed, one in which the work table was revolved and several work pieces were fastened thereto and rotated from station to station, and the other, one in which the table was stationary and only one piece was fastened thereon.

With the revolving or index type of table, the work pieces were machined on the same side by different machines, while with the stationary table, the work piece was machined on different sides by separate machines. In either case, only one side was machined by each machine, and additionally, the work piece was machined on only those few sides which could be reached by machines whose body size and operation permitted them to be used in a cluster, it being appreciated that room had to be provided also for the operator and also access to the work table for the setting and removal of the work pieces.

Consequently, it will be observed, that the number of sides of a work piece machined at any given time was limited and there were always some sides left unfinished if a work piece had more sides to be finished than could be done at any particular work table. This necessitated additional subsequent and successive operations. In addition to this, those machining operations which could not be performed in combination with other machining operations also required subsequent operations before the work piece was completely finished, and the successive machining operations thus needed to finish a work piece were greatly multiplied and the total of the successive increments of time required for the successive operations, the extra labor, the expense of machines to perform the extra operations, and the floor space occupied by the extra machines became a large and objectionable part of the cost of production encountered in machining work pieces in the conventional manner.

One of the objects of the invention is to provide a device of the class described which reduces the succession of operations conventionally required to finish a work piece.

Another object of the invention is to provide a device of the class described, performing upon a work piece at one setting a plurality of otherwise successive operations required to finish the work piece.

Another object of the invention is to provide a single machining unit combining and performing a plurality of operations upon more than one side of a work piece.

Another object of the invention is to provide a machining unit performing a plurality of distinct operations upon a work piece from different directions.

Another object of the invention is to provide a machining unit performing a plurality of different operations upon different sides of a work piece at a single setting thereof.

Another object of the invention is to provide a device of the class described, traversing towards a work piece in one direction, and machining the work piece from a plurality of directions, one or more of which are different from the first direction.

Another object of the invention is to provide a machining unit brought into work position by a single traversing movement and performing a plurality of machining operations upon several different faces of the work.

Another object of the invention is to provide in combination with a conveyor for work pieces, a machining device traversing across the path followed by the work piece on the conveyor and machining the work piece upon a face angled relative to said path.

Another object of the invention is to provide a machining unit traversing into the path followed by a work piece when fed to or removed from the machining device, and performing a machining operation upon the part within the projected path of said work piece.

Another object of the invention is to perform simultaneously a plurality of operations having timed cycles, in which several of the operations having fast cycles are performed successively by one machining unit approximately within the cycle of a slower operation performed by another unit.

Another object of the invention is to provide a combined drill and tap head traversed by a single movement, wherein the feed of the drill brings the tap into work position for performing an operation at an angle relative to the drill.

Another object of the invention is to provide a device of the class described, which is simple in construction and operation, thoroughly effective in its use, and inexpensive to manufacture, install and maintain.

These being among the objects of the invention, other and further objects will become apparent from the drawings herein, the description relating thereto, and the appended claims.

Referring now to the drawings.

Figures 1, 2:
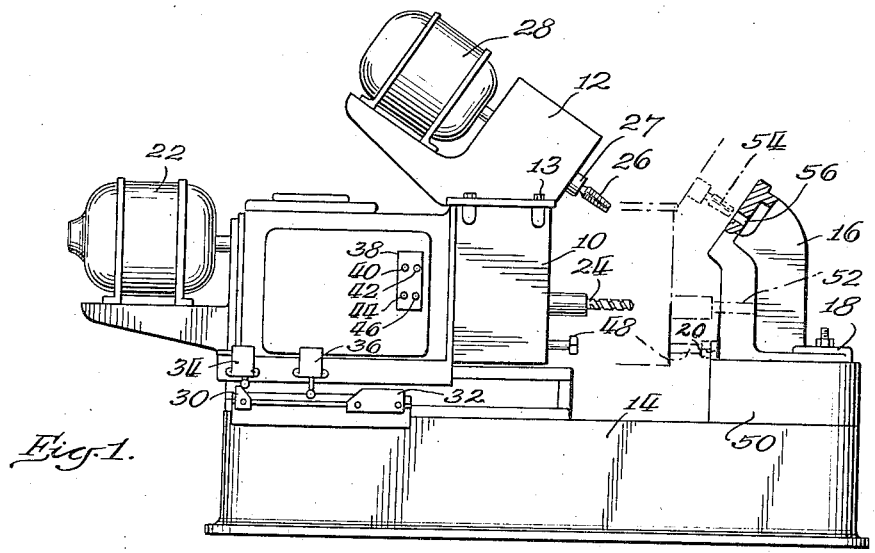
Fig. 1 is a side elevation of a combined drill and tap unit illustrating a preferred embodiment of the invention.
Fig. 2 is a diagrammatical illustration of the electrical circuits forming a part of the invention for controlling the device illustrated in Fig. 1.

Referring now to the drawings in further detail, and particularly Fig. 1, a better understanding of the invention will be had when it is observed that a drill head 10, carrying the drill 24, is mounted for horizontal traverse upon a base 14 for movement towards and away from a work piece 16. The work piece 16 is also located upon the base 14, where it is held in place by a clamp 18 against a positioning fixture 20. A tap head 12 is rigidly carried by the drill head 10, with a tap 26 carried thereby disposed at an angle relative to the drill 24. The drill head 10 is powered by the motor 22, and the tap 26 is powered by the motor 28.

Two sets of controls are employed for operating the device. One of these sets, the manual control, is accomplished directly by means of the manual movement of the four switch buttons mounted conveniently at hand in the switch box 38, the four buttons comprising a "start" button 40, a "stop" button 42, a "forward" traverse button 44, and a "reverse" traverse button 46. The other controls are automatic ones, comprising two normally open contact switches 34 and 36 mounted upon a drill head and the cam members 30 and 32, rigidly mounted in an adjustable manner upon the base 14, and which actuate the switches 34 and 36, respectively, with the traversing movement of the drill head 10.

An adjustable stop 48 is carried by the drill head to contact the work supporting block 50 when the feed of the drill 24 into the work piece 16 is completed, as indicated in phantom by the numeral 52, at which time the tap 26 is brought into its work position, as indicated in phantom at 54, to start its cycle of operation. The feed of the taps may be automatic as an incident to their rotation, the mechanism for accomplishing this result being of the type shown in prior Patents 1,681,289 and 2,086,095. The adjustable stop 48, the drill 24, and the tap 26 are so adjusted relative to each other, that their operation in the above relation is assured once the drill feed depth is determined and the work piece properly positioned for such.

In addition to functioning as a drive for the drill 24, the motor 22 serves, by a suitable means, (not shown) to supply oil under pressure to actuate the piston rod 58, diagrammatically shown in Fig. 2 as controlled by the spool valve 60. The piston rod 58 is connected directly to the drill head 10 for traversing the latter, while the cylinder 59, in which the piston rod 58 is mounted, is secured relative to the base 14.

Having thus described the physical elements performing the functions indicated, the control and operation of these elements will be better understood with reference to Fig. 2, wherein the electrical circuits which coordinate and control the several functions mentioned are illustrated and operated according to a predetermined pattern.

The electrical units employed in the electrical circuits of the invention comprise the drill motor 22 and the reversing tap motor 28, already mentioned, the latter having a forward terminal 60 and a reversing terminal 62; a magnetic brake (not shown) for the tap motor 28 to prevent a reverse overrunning of the tap feed 27; manually actuated contact control switches comprising a normally open start switch 72 controlled by the button 40; a normally closed stop switch 74 controlled by the button 42; normally open switches 76 and 78 controlled by buttons 44 and 46, respectively; a relay 84 controlling four switches, 86 and 88 of which are normally closed, and 90 and 100 of which are normally open; a rotary limit switch actuator 102, which is operated by a worm gear and thread assembly 104 in direct relationship with the turning of a tap 26, and is provided with two inter-connected contacts operating to close three switches, two of which, 106 and 108, are normally closed, and the third, 110, normally open when the tap 26 is fully retracted; a single throw double contact snap switch having an actuator 112 operated by opposing solenoids 114 and 118, whereby the switch 120 is closed when the solenoid 114 is energized, and the switch 122 is closed alternately therewith when the solenoid 118 is energized; and main power lines 64 and 66, which are represented diagrammatically by a square symbol 68 and a ground symbol 70, respectively.

Referring more particularly to the automatically controlled mechanical units employed in connection with the electrical circuits, namely, the normally open switches 34 and 36 already described, these switches are closed when their contact arms are raised by the cam members 30 and 32, respectively. The switch 34 is closed by the cam member 30 when the drill head is in its fully retracted position and opens when the forward traverse is commenced. The switch 36 is normally open, and is closed by the cam member 32 when the drill feed is completed and the adjustable stop 48 contacts the work support 50.

Before describing the electrical circuits involved, it may be well to point out the preferred pattern according to which the invention illustrated is operated.

The drill motor is first started. This rotates the drill 24 and develops oil pressure for moving the piston rod 58. Thereafter, the forward traverse button is pressed and the drill head advanced at a rapid traverse until the work station of the drill is reached, whereupon the drill head forward traverse is cut to a drill feed rate. The means for traversing and feeding the drills may be of any well known type, such as shown in Patent No. 2,108,779. When the drilling operation is completed, the forward rotation of the tap 26 is commenced, fed into the work and reversed. After reversal and withdrawal of the tap is completed, the drill head is automatically returned to its start position at a rapid reverse traverse all the way, the reverse rotation of the tap motor having ceased the instant the tap cleared the work.

When it is desired to start the drill motor 22, the normally open start switch 72 is temporarily closed. This completes a circuit commencing at the power line terminal 68a and includes the normally closed stop switch 74, relay 144, the drill motor 22, the overload switch 146, and terminates at the ground terminal 70a. The relay 144 is energized simultaneously with the drill motor 22, and with the closing of the relay switch 144a a self-sustaining circuit is completed, exclusive of the start switch 72. This sustaining circuit is one starting at the terminal 68a and extends through the normally closed stop switch 74, the relay switch 144a, which is now closed by the solenoid 144, the solenoid 144, the drill motor 22, the overload switch 146, and terminates at the ground terminal 70a.

With the drill motor running and the oil pressure built up thereby, the forward traverse button 44 is pressed, closing the switch 76. Due to the fact that the automatic switch 24 is now closed by the cam member 30, this completes a circuit starting at the terminal 68b and running through the now manually closed switch 76, line 76b, the now closed automatic switch 34, line 34b, and through the solenoids 80 and 114 to the ground terminal 70b. With the energization of the solenoid 80, the spool valve 60 is drawn to forward position, a position opposite to that illustrated in Fig. 2, and a hydraulic flow of oil under pressure is directed to the rear side 148 of the traversing piston 150. The solenoid 114 draws a snap switch to the position illustrated in Fig. 2 whereby the switch 122 is open to prevent energization of the spool valve reversing solenoid 82, and the switch 120 is closed as one of two open links, the other of which is the automatic switch 36, whereby the "forward" circuit of the tap motor 28 is made ready for the time when the automatic switch 36 is closed.

Thereafter, the piston 150 is driven hydraulically forward at a rapid traverse until such time as the drill 24 is brought into its work position, whereupon the forward traverse of the drill head is reduced to the feed rate of the drill 24 in a well-known manner. When the drill feed is completed, the stop 48 comes in contact with the work support 50 and simultaneously therewith the automatic switch 36 is closed by the cam member 32. This completes the circuit, of which the automatic switch 36 was the last link, and starts the forward turning of the tap motor 28. The circuit starts at the terminal 68b, and includes in series, line 36a, switch 36, line 36b, closed snap switch 120, line 106a, closed switch 106 of the rotary limit switch actuator 102, line 106b, the solenoid of the relay 84, line 84b, the forward winding of the tap motor 28, the overload switch 152, and terminal 70c. With the energization of the solenoid relay 84, switch 100 thereof closes to complete a sustaining circuit for the forward winding of the tap motor 28, which commences at the terminal 68c, runs through the now closed switch 100, line 100b, into line 106a, from whence it continues, as already described, to the terminal 70c, including the forward winding of the tap motor 28.

Simultaneous with the closing of the switch 100, normally open switch 90 of the relay 84 is also closed, which completes a circuit partly in shunt with the sustaining circuit just described, which leads from the sustaining circuit beyond the switch 106 and runs through line 90a, now closed switch 90, line 90b, solenoid 118, line 118b to pole 70c. When the solenoid 118 is energized, which for all practical purposes happens immediately after the forward traverse button 44 is pressed, the snap switch 112 is snapped over, opening switch 120 of the forward traverse initiating circuit, and closing switch 122, which completes one of three links in the spool valve solenoid reversing circuit, of which the other two links are the now open relay switch 86 and the now closed time limit switch 108. Since the normally closed switch 86 is now open, this obviously prevents any possibility of the spool valve reversing solenoid 82 being energized in any way at this time, and the normally closed switch 88 of the relay is also opened to prevent any energizing of the reverse winding of the tap motor 28.

The forward rotation of the tap motor 28 started by the closing of the snap switch 120 and sustained by the sustaining circuit involving the now closed relay switch 100 continues until such time as the rotary limit switch is snapped to its alternate position, the latter taking place when the tap feed is completed. When the rotary limit switch reverses its position, switches 106 and 108 are opened and switch 110 closed. When the switch 106 is opened, the sustaining circuit through the relay 84 and the forward winding of the tap motor 28 is broken and the relay switches 86, 88, 90 and 100 reassume their positions, as illustrated in Fig. 2, the relay solenoid 84 being de-energized. With the opening of the rotary limit switch 108, the circuit including the now closed snap switch 122, and the closed relay switch 86, is kept open in a way preventing the spool valve reversing solenoid from being energized. This obviates any danger of a reverse traverse while the tap 26 is still in the work piece 16.

The forward turning of the tap motor 28 having been stopped, the closing of the rotary limit switch 110 completes a circuit through the reverse winding of the tap motor. This circuit commences at the pole 68d, runs through the now closed switch 110, line 110b, closed relay switch 88, line 88b, the reverse winding of the tap motor 28, the overload switch 152, and terminates at the pole 70c. This starts the reverse movement and withdrawal of the tap 26 from the work piece 16, which will continue until the rotary limit switch is again thrown into the position disclosed in Fig. 2.

When this takes place, this indicates that the tap 26 is free of the work piece 16, and the reverse traverse of the drill head may be commenced. With the return of the rotary limit switch to the position shown in Fig. 2, the switch 108 is closed as the last open link now existing in the circuit energizing the spool valve reverse solenoid 82. This circuit commences at the terminal 68d, runs through the closed switch 108, line 108b, now closed switch 122, line 122b, closed relay switch 86, line 86b, solenoid 82, and ends at the ground terminal 70d. Thereupon the spool valve 60 is drawn towards the solenoid 82 and the hydraulic pressure fed to the forward side 154 of the cylinder to bring about a rapid reverse traverse of the drill head to its starting position, in which the automatic switch is again closed by the cam member 30 preparatory to a repeat of the cycle just described whenever the forward traverse button 44 is again pressed.

For the sake of simplicity, the safety devices have been omitted from the circuits illustrated in Fig. 2, and for the same reason the control circuits for the drill and tap motors have been illustrated as running directly to the motor, rather than showing the relays normally employed to handle the heavy power load needed for the motors.

Figure 3:
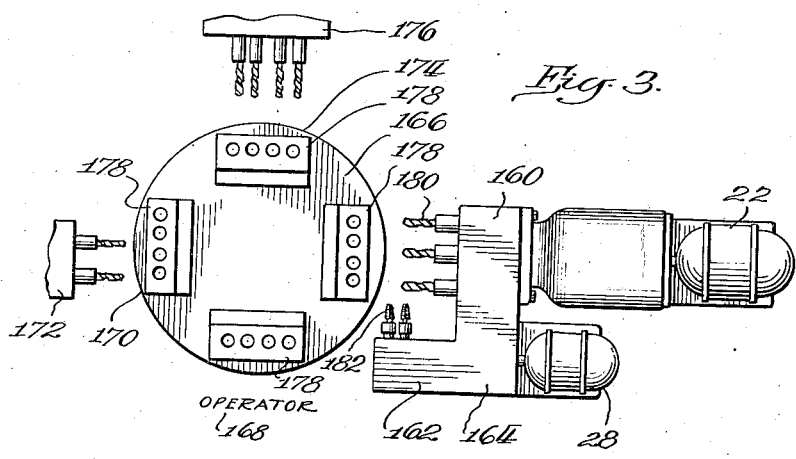
Fig. 3 is a plan view of a cluster of machines one of which illustrates another embodiment of the invention.
Figure 4:
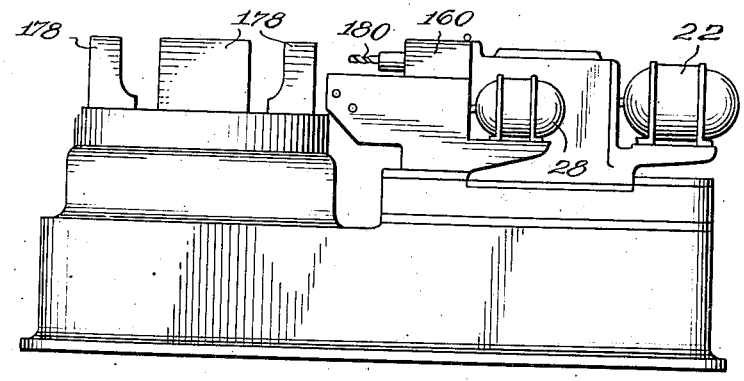
Fig. 4 is a side elevation and projection of the apparatus illustrated in Fig. 3.

Referring now to Figs. 3 and 4, it will be observed that another embodiment of the invention is illustrated, wherein the drill and tap units 160 and 162, respectively, are contained in an integral housing and disposed side by side in a horizontal plane, rather than in a vertical plane as illustrated in Fig. 1. The unit thus provided is associated at one station of a rotary work table 166, which has therearound three other stations, one of which, 168, is for the operator, another, 170, is for a machining unit, 172, and the third, 174, is for a machining unit, 176. The work pieces illustrated in Figs. 3 and 4, comprise internal combustion engine blocks 178, which are to be machined upon more than one side.

In this particular embodiment, it will be observed that the drills 180 operate in a direction radial to the revolving work table 166 and normal to the side of the blocks 178 when indexed at that particular station. On the other hand, the taps 182 move with the traverse of the drill head into the path followed by the blocks 178 when they are rotated with the work table, and from there are fed into the end of the blocks 178 at a right angle to and in cooperation with the operation of the drills 180. This particular embodiment serves to perform an additional machining operation upon each block without adding to the operating time of the several units clustered around the work table 166, since the taps 182 are combined to operate with the drills 180 in an overall cycle not to exceed one of the approximate operating time cycles of either or both of the other units 172 and 176.

Figure 5:
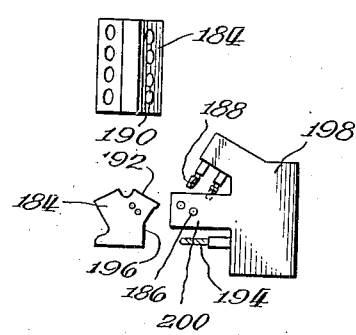
Fig. 5 is a side elevation, partly in projection, of a construction illustrating another embodiment of the invention.

Referring to Fig. 5, it will be observed that a three-directional machining operation is performed upon a work piece 184. This work piece is a V-8 block for an internal combustion engine requiring machining operations upon a plurality of sides. In this particular embodiment, taps 186 and 188 machine the end 190 and face 192, respectively, of the block 184, while the drills 194 operate into the side 196 of the block. The taps 186, the taps 188, and the drills 194 are all angled, each relative to the others, and this particular modification is employed to process engine blocks carried end to end in a spaced relation along a straight line conveyor although it may be used to serve in connection with a revolving work table. The traversing movement of the drill head 198 projects the tap head 200, carrying the taps 186 into the path traversed by the block 184 upon the conveyor, and from this position they machine the end 190 thereof within the projection of the path followed by the block 184 upon the conveyor.

This particular embodiment obviates the need for the subsequent handling of each block, in which the block would have to be turned crosswise of the conveyor and fed into or between another set of machines to finish the ends 190 thereof.

With this embodiment, it will be appreciated that a three-directional combination drill and tap unit similar to that shown in Fig. 5 could be employed with equal success upon the other side of the block 184 and operations for all sides performed thereon at one setting and at one time, whereas conventionally a large number of settings and a much longer and costlier product on schedule would be required to finish the work piece.

In this way it will be observed that the invention provides an improved method for finishing work pieces, and, in addition to the expressed objects, a machining unit performing a plurality of distinct operations is provided, either to work alone, or in cooperation with others, to machine a work piece upon more than one side, some of which are otherwise inaccessible with conventional practices. Additionally, a saving in time, labor, machines and floor space is accomplished, and the invention eliminates many discrepancies arising out of numerous settings of a work piece upon different fixtures. Moreover, the invention provides machining units performing a plurality of operations upon a work piece independent of and free from any space restrictions or conveyor requirements normally encountered in machining a work piece.

Consequently, although preferred embodiments of the invention have been shown and described therein, it will be apparent to those skilled in the art that various uses, modifications and changes may be made therein without departing from the spirit and substance of the invention, the scope of which is commensurate with the appended claims.

What I claim is:

1. In a unit of the class described, a work table, a drilling mechanism movable to and from said table for machining operations, a tap mechanism carried by said drilling mechanism and traversed with said drilling mechanism, means for feeding said drilling mechanism relative to said table and indexing said tap mechanism, and means for feeding said tap mechanism independently of said drill feeding means.

2. In a unit of the class described performing a plurality of machining operations in different directions, a machine tool and drive for each operation mounted one upon another, means for rapid traversing said machine tools together as a unit relative to work piece and feeding one of said tools in its operation to a position indexing another of said tools, and means for feeding the last-named tool successively and independently of the first fed tool.

3. In a unit of the class described, a work table, a drilling mechanism movable to and from said table for machining operations, a tap mechanism carried by said drilling mechanism at an angle thereto and traversed with said drilling mechanism, means for feeding said drilling mechanism relative to said table, and means for feeding and reversing said tap mechanism independently of said drill feeding means.

4. In a machine tool of combined units carried by one another and performing a plurality of machining operations having different feed characteristics of which the respective lines of feed are angled one to another, means for traversing said units simultaneously along one of said lines of feed and feeding the unit having said line of feed, means for positioning said unit at the end of said feed for indexing another of said units, separate means for controlling and feeding said last unit to the completion of the work cycle thereof, and means for reverse traversing said units simultaneously.

5. In a unit of the class described having a work table, a machining mechanism traversable relative to said work table, a second machining mechanism rigidly carried by said first mechanism and traversable simultaneously therewith, and means for feeding said mechanisms independently according to a predetermined pattern of operation in which the feed movement of one of said mechanisms indexes the other of said mechanisms.

6. In a device of the class described, a work table, a machine tool unit, power driven means for traversing said table and unit relative to each other in a given direction for performing a machining operation upon a work piece on said table, a second machine tool unit rigidly carried by said first tool unit for performing a second machining operation upon the same work piece in a direction angled to said first direction, means positioning said first means at a predetermined point of said traverse for indexing said second tool, and automatic control means for initiating the operation of said second machine tool unit upon the indexing thereof.

7. In a device of the class described a work table, a machine tool unit, power driven means for rapid traversing and feeding said table and unit relative to each other in a given direction to perform a machining operation upon a work piece on said table, means carried by said machine tool unit for performing a second machining operation upon the same work piece in a direction angled to said first direction, and automatic control means for indexing and initiating the operation of said carried means at a predetermined point of said feed of said machine tool unit.

8. A machine tool comprising a work table, a tool unit, hydraulic means for traversing said table and unit relative to each other through a rapid forward, feed forward and rapid reverse traverse cycle to perform a machining operation upon a work piece on said work table, a second tool unit carried by said first tool unit for performing a machining operation upon the same work piece, stop means for positioning said first unit prior to said reverse traverse to index said second tool unit, interlocking control means actuated upon said indexing for initiating operation of said second tool unit through a machining cycle and means actuated upon the finish of said last machining cycle for effecting operation of said hydraulic means to accomplish said rapid reverse traverse.

9. A machine tool comprising a work table, a tool unit, means for traversing said table and unit relative to each other in given direction through a motion including a feed movement, a tap head carried by said tool unit, a reversing motor and mechanism for driving said head, means for positioning said tool unit at the end of said feed movement to index said tap head, electrical interlocking circuits for maintaining said indexing position and controlling the operation of said reversing motor including a control responsive to the indexing of said tap head for effecting a forward running of said motor, a rotary limit device operative to stop said forward running of said motor at a predetermined point and effect a reversal of said motor, and means controlled by said rotary limit device for traversing said table and tool unit in a direction opposite said first direction.

HOWARD CREGAR.